Sept. 12, 1950     R. A. CLARK     2,521,900
CHIP BREAKING DEVICE
Filed Sept. 1, 1945
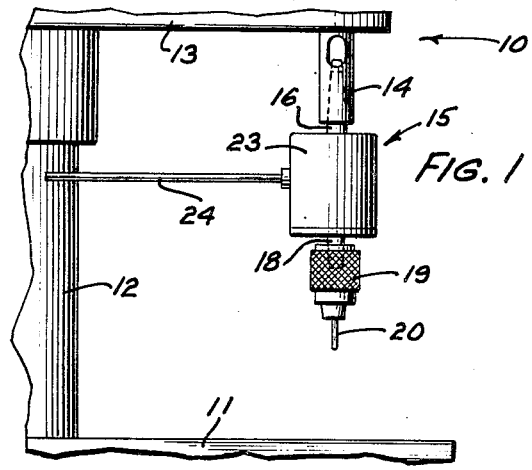
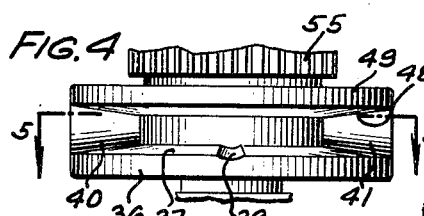
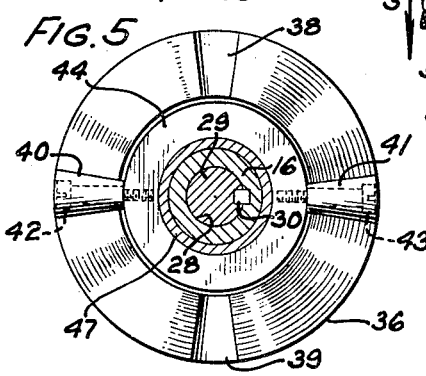
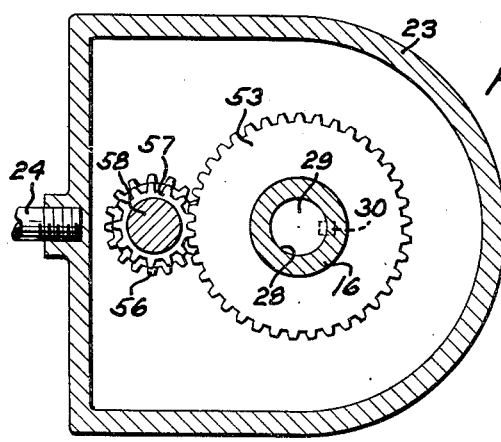
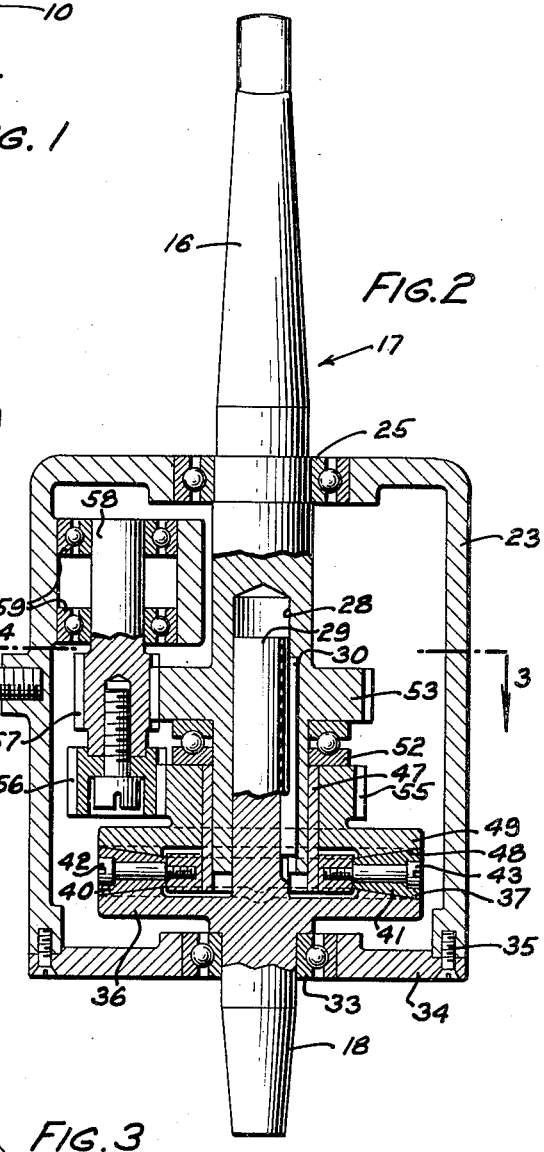
INVENTOR.
R. A. CLARK
BY
*Harry C. Duft*
ATTORNEY

Patented Sept. 12, 1950

2,521,900

UNITED STATES PATENT OFFICE 2,521,900

CHIP BREAKING DEVICE

Robert A. Clark, Oak Park, Ill., assignor to Western Electric Company, Incorporated, New York, N. Y., a corporation of New York Application September 1, 1945, Serial No. 614,015

4 Claims. (Cl. 77—33)

This invention relates to a chip breaking device and more particularly to a chip breaking attachment for use in a drilling machine.

In some forms of devices for breaking drill chips, the chip is broken once or more often for each revolution of the drill. This frequent breaking of the drill chip produces a high frequency of vibration which is fatiguing to the operator and increases the wear on the machine.

An object of this invention is to provide an improved and effective chip breaking attachment for use in drilling machines which produces the breaking of the drill chip once for a plural number of rotations of the drill.

In accordance with one embodiment of the invention, there is provided a chip breaking attachment having a driving shaft and an axially movable driven shaft splined together for rotation in unison, which are connected respectively to a spindle of a drilling machine and to a drill. The downward thrust of the spindle is transmitted from the driving shaft to the driven shaft through an annular rotatable thrust member mounted on the driving shaft and a pair of diametrically opposed rollers interposed between and in rolling engagement with the annular thrust member and a cam track on the lower shaft, which track is provided with a pair of axially extending diametrically opposed notches therein. Driving means connected to the driving shaft are provided for rotating the annular thrust member in the same direction as, and relative to the shafts, when the shafts are rotated, so that the rollers are rolled between the annular member on the driving shaft and the cam track on the driven shaft, and roll into and out of the notches therein to effect an axial reciprocation of the driven shaft for a multiple number of rotations thereof and cause the drill attached thereto to break the chip.

The invention will be more fully understood from the following description taken in connection with the accompanying drawings, in which:

Fig. 1 is a side elevational view of a portion of a drilling machine showing the invention in position thereon;

Fig. 2 is a vertical sectional view of the device embodying the invention;

Fig. 3 is a horizontal sectional view taken on the line 3—3 of Fig. 2;

Fig. 4 is a side elevational view of a portion of the device showing the annular track members and the rollers interposed therebetween; and Fig. 5 is a horizontal sectional view taken on the line 5—5 of Fig. 4.

Referring to the drawings, there is shown a drill press 10 comprising a table 11 and a vertical standard 12, on which is adjustably mounted a head 13 supporting a rotatable spindle 14. The chip breaking device 15 is attached to the spindle 14 by means of an upper section or shaft 16 of a sectional or two-part arbor 17, the lower arbor section or shaft 18 of which has secured thereto a chuck 19, in which a drill may be secured, as indicated at 20. The chip breaking device 15 is enclosed in the housing or casing 23, to which is attached a rod 24, which extends outwardly and engages the standard 12 to prevent the turning of the housing.

The upper or driving shaft 16 of the arbor 17 is secured in a bearing 25 carried in the upper wall of the housing 23 and is provided, in its lower end, with a cylindrical recess 28 for receiving a reduced end 29 of the lower or driven shaft 18. The two shafts are connected for rotation together by a spline 30, which permits axial movement of the lower section 18 relative to the upper section 16. The lower shaft 18 is slidably mounted in a ball bearing 33 fixed in a bottom cover plate 34, which is secured to the housing 23 by screws 35 and forms a part thereof.

The lower shaft 18 is provided with a circular flange or cam plate 36, on the upper portion of which is formed a track or cam surface 37, which, in part, is conical in form. The conical surface of the track 37 is interrupted by a pair of diametrically opposed shallow notches or recesses 38 and 39 forming camming surfaces. A pair of frusto-conical rollers 40 and 41, forming cooperating cam members, are mounted on pins 42 and 43 secured to a ring 44 and engage and are supported on the track 37. The ring 44 is mounted for rotation about a sleeve 47, which is rotatably mounted on the lower end of the upper arbor section 16. The rollers 40 and 41 engage a conical-shaped track 48 formed on the lower side of an annular member 49 mounted on the sleeve 47 for rotation about the arbor. The upper face of the annular member 49 seats against a thrust bearing 52 which, in turn, is seated against a shoulder formed by a gear 53 on the upper shaft 16.

The annular member 49 is axially fixed relative to the upper shaft 16 and forms a thrust member having the smooth track 48 thereon, against which the rollers 40 and 41 may roll, and through which the thrust is transmitted to the cam plate 36 of the lower shaft 18. When the cam plate 36 is rotated relative to the annular member 49, the rollers 40 and 41 are revolved about the axis of the arbor and rollingly engage the opposite tracks 48 and 37 and ride into and out of the shallow recesses 38 and 39. The track 37 and recesses 38 and 39, in cooperation with the rollers 40 and 41, determine the axial relation of the lower shaft 18 with respect to the upper shaft 16 so that when the rollers ride from the conical portion of the track 37 into the recesses 38 and 39 and back onto the conical portion, the lower shaft 18 and the drill carried thereby will be axially reciprocated, which reciprocation breaks the chip being cut by the drill. When the track 37 has made one complete revolution relative to the track 48, the rollers 41 and 42 will have revolved one-half of one revolution relative to the tracks and effected one reciprocation of the drill 18.

In order to reduce the frequency of the axial reciprocations of the lower shaft 18 with respect to a given number of rotations of the shafts, means are provided for rotating the annular member 49 and the rollers 40 and 41 in the same direction as the shafts, but at a different rate of speed so as to effect one reciprocation of the lower shaft for a multiple number of rotations thereof. To this end the annular member 49 is provided with a gear 55, which meshes with a gear 56. The gear 56 is in coaxial alignment with and is secured to a smaller gear 57 meshing with the gear 53 on the shaft 16. The gears 56 and 57 are carried by a shaft 58 mounted in a pair of ball bearings 59 secured in the housing 23. When the shafts 16 and 18 are rotated, the annular member 49 will be rotated through the gears 53, 57, 56 and 55 in the same direction as the shafts, but at a different rate of speed, so as to produce relative rotary movement between the track 48 thereon and the track 37 on the flange 36 of the lower shaft 18. Thus, when the shafts are rotated, the upper track 48 will be rotated relative to the cam track 37 at a reduced rate of movement, causing a rolling of the rollers 40 and 41 therebetween and a revolving of the rollers about the axis of the shafts and periodic axial reciprocation of the lower shaft 18 and the drill attached thereto. The number of rotations of the shafts 16 and 18 necessary to produce one rotation thereof relative to the annular member 49 and cause one reciprocation of the shaft 18 is controlled by the ratios of the gears 53, 57 and 56, 55, so that by varying the gear ratios, the number of rotations of the arbor necessary to effect one reciprocation of the drill may be varied.

What is claimed is:

1. A chip breaking device for a drilling machine comprising a driving shaft, an axially reciprocatable driven shaft splined to said driving shaft for rotation therewith, a non-rotatable housing in which said shafts are rotatably mounted, an annular flange on said driven shaft having an annular track concentric with said shaft, an annular member rotatably mounted on said driving shaft in axially fixed relation thereto and having an annular track thereon opposed to said first mentioned track, a gear on said annular member, a pair of diametrically opposed rollers interposed between said tracks and adapted to roll thereon, means for mounting said rollers for revolving movement around said shafts, a gear fixed to said driving shaft, and gear means interconnecting the gear on said driving shaft and the gear on said annular member and operable for rotating said annular member relative to said shafts in response to rotation of said shafts, said track on said annular flange having a pair of diametrically opposed axially extending notches therein, whereby when said shafts are rotated the rollers will ride into and out of said notches and effect an axial reciprocation of said driven shaft for a multiple number of rotations thereof.

2. A chip breaking attachment for a metal drilling machine comprising a drive shaft, a reciprocable driven shaft connected to said drive shaft for rotation therewith, a housing in which said shafts are rotatably mounted, means for preventing the rotation of said housing, an annular thrust member mounted for rotation about and in fixed axial relation to one of said shafts and having an annular track thereon, an annular track on said other shaft disposed in opposed relation to the track on said thrust member, roller means interposed between and in engagement with said tracks and mounted for rotary movement about the axis of said shafts, a cam element on one of said tracks, a gear on said thrust member, a gear connected to and rotatable with one of said shafts, and gearing interconnecting the gear on said thrust member and the gear on said shafts to rotate said thrust member relative to said shafts in response to rotation of said shafts to effect axial reciprocation of said driven shaft for a multiple number of rotations thereof.

3. A chip breaking device for a metal drilling machine comprising a driving shaft, a driven shaft axially movable relative to said driving shaft, means connecting said shafts for rotation in unison, a non-rotatable housing in which said shafts are rotatably mounted, an annular track on one of said shafts, an annular member mounted for rotation on said other shaft and against axial movement relative thereto and having an annular track thereon opposed to said annular track on said shaft, a roller interposed between and rollingly engaging said annular tracks, means for guiding said roller for movement around the axis of said shafts and between said tracks, a cam element on one of said tracks engageable with said roller for causing a relative movement axially between said cam and said roller, a gear on said annular member, a gear fixed to one of said shafts, and gear means interconnecting said gear on one of said shafts and said gear on said annular member to rotate said annular member relative to said shafts in response to rotation of said shafts.

4. A chip breaking device for a metal drilling machine comprising a driving shaft, a driven shaft axially movable relative to said driving shaft, means connecting said shafts for rotation in unison, a non-rotatable housing in which said shafts are rotatably mounted, an annular track on one of said shafts, an annular member mounted for rotation on said other shaft and against axial movement relative thereto and having an annular track thereon opposed to said annular track on said shaft, a roller interposed between and rollingly engaging said annular tracks, means for guiding said roller for movement around the axis of said shafts and between said tracks, a cam element on one of said tracks engageable with said roller for causing a relative movement axially between said cam and said roller, a gear on said annular member, a gear fixed to one of said shafts, and a gear cluster comprising a pair of spur gears rotatably supported in said housing for rotation about an axis parallel with said shafts and meshing with said gear on said annular member and said gear fixed to one of said shafts to rotate said annular member relative to said shafts in response to rotation of said shafts.

ROBERT A. CLARK.

REFERENCES CITED

The following references are of record in the file of this patent:

UNITED STATES PATENTS

| Number | Name | Date |
|---|---|---|
| 1,523,629 | Bullock | Jan. 20, 1925 |
| 2,105,762 | Zimmerman | Jan. 18, 1938 |
| 2,412,211 | Eichelman | Dec. 10, 1946 |
| 2,453,137 | Karweit | Nov. 9, 1948 |